US012288513B2

(12) United States Patent
Nam

(10) Patent No.: US 12,288,513 B2
(45) Date of Patent: Apr. 29, 2025

(54) DISPLAY DRIVING METHOD AND APPARATUS, DISPLAY DRIVER INTEGRATED CIRCUIT CHIP AND TERMINAL

(71) Applicant: Beijing ESWIN Computing Technology Co., Ltd., Beijing (CN)

(72) Inventor: Kevin Nam, Beijing (CN)

(73) Assignee: Beijing ESWIN Computing Technology Co., Ltd., Beijing (CN)

( * ) Notice: Subject to any disclaimer, the term of this patent is extended or adjusted under 35 U.S.C. 154(b) by 108 days.

(21) Appl. No.: 18/161,798

(22) Filed: Jan. 30, 2023

(65) Prior Publication Data

US 2023/0419892 A1 Dec. 28, 2023

(30) Foreign Application Priority Data

Jun. 28, 2022 (CN) ........................ 202210741621.X

(51) Int. Cl.
*G09G 3/32* (2016.01)
*G09G 3/3208* (2016.01)
*G09G 3/36* (2006.01)

(52) U.S. Cl.
CPC ............. *G09G 3/3208* (2013.01); *G09G 3/36* (2013.01); *G09G 2310/0232* (2013.01)

(58) Field of Classification Search
CPC .......... G09G 3/3208; G09G 3/32; G09G 3/36; G09G 2310/0232; G09G 3/20; G09G 5/006; G09G 5/18; G09G 2310/08; G09G 2330/021; G09G 2340/0435; G09G 2350/00; G09G 2360/18; G09G 2370/08; G09G 2370/10; G09G 3/3611; G09G 2340/0471
See application file for complete search history.

(56) References Cited

U.S. PATENT DOCUMENTS

2007/0229418 A1* 10/2007 Yun ...................... G09G 3/2092 345/87
2009/0079682 A1* 3/2009 Yamato ................ G09G 3/3406 345/89
2013/0141641 A1* 6/2013 Wu ........................... G06T 5/73 348/606
2019/0130845 A1* 5/2019 Han ..................... G09G 3/3266

FOREIGN PATENT DOCUMENTS

| | | | |
|---|---|---|---|
| CN | 104282286 | A | 1/2015 |
| CN | 106205460 | A | 12/2016 |
| CN | 108665840 | A | 10/2018 |
| CN | 113299251 | A | 8/2021 |
| JP | 2000122606 | A | 4/2000 |
| JP | 2013200341 | A | 10/2013 |
| KR | 20080062492 | A | 7/2008 |

OTHER PUBLICATIONS

SIPO, Notice of the first review opinion, CN application 202210741621.X, Jan. 9, 2025, p. 1, China.

* cited by examiner

*Primary Examiner* — Pegeman Karimi
(74) *Attorney, Agent, or Firm* — BakerHostetler

(57) ABSTRACT

A display driving method includes: receiving a current image frame; generating a vertical porch corresponding to the current image frame according to a current image transmission speed of an application processor (AP); and driving a display screen to display the current image frame according to the vertical porch corresponding to the current image frame.

17 Claims, 10 Drawing Sheets

DISPLAY DRIVING METHOD AND APPARATUS, DISPLAY DRIVER INTEGRATED CIRCUIT CHIP AND TERMINAL

CROSS-REFERENCE TO RELATED APPLICATIONS

This application is based upon and claims priority to Chinese Patent Application No. 202210741621.X, filed Jun. 28, 2022, the entire contents of which are incorporated herein by reference.

TECHNICAL FIELD

The present disclosure relates to a display technical field, and more particularly to a display driving method and apparatus, a display driver integrated circuit (DDIC) chip and a terminal.

BACKGROUND

With the continuous development of the display technology, more and more high refresh rate display screens come into being. In addition to 60 Hz refresh rate, more and more display screens also support 144 Hz, 120 Hz, 30 Hz and 10 Hz refresh rates. That is to say, the refresh rate of the display screen is changeable during the display.

Generally, when the refresh rate of the display screen of a terminal changes, an image transmission speed of an application processor (AP) in the terminal also will change, that is, a write speed of a frame memory will change, which may result in a mismatch between the write speed and the read speed of the frame memory and a tearing effect (TE) of a display image on the display screen.

SUMMARY

The present disclosure provides a display driving method, a display driving apparatus, a display driver integrated circuit (DDIC) chip and a terminal.

In a first aspect of embodiments of the present disclosure, a display driving method is provided. The method includes: receiving a current image frame; generating a vertical porch corresponding to the current image frame according to a current image transmission speed of an AP; and driving a display screen to display the current image frame according to the vertical porch corresponding to the current image frame.

In a second aspect of embodiments of the present disclosure, a display driving apparatus is provided. The display driving apparatus is applicable in a DDIC chip and includes: a mobile industry processor interface (MIPI) configured to receive a current image frame; an adaptive porch controlling component configured to generate a vertical porch corresponding to the current image frame according to a current image transmission speed of an AP; and a driving component configured to drive a display screen to display the current image frame according to the vertical porch corresponding to the current image frame.

In a third aspect of embodiments of the present disclosure, a display driver integrated circuit (DDIC) chip is provided. The DDIC chip includes the display driving apparatus according to the second aspect of embodiments of the present disclosure.

In a fourth aspect of embodiments of the present disclosure, a terminal is provided. The terminal includes a display screen; a DDIC chip electrically connected with the display screen; and an AP electrically connected with the DDIC chip through a mobile industry processor interface (MIPI). The DDIC chip is configured to drive the display screen to display an image transmitted from the AP by performing the display driving method according to the first aspect of embodiments of the present disclosure.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1A:
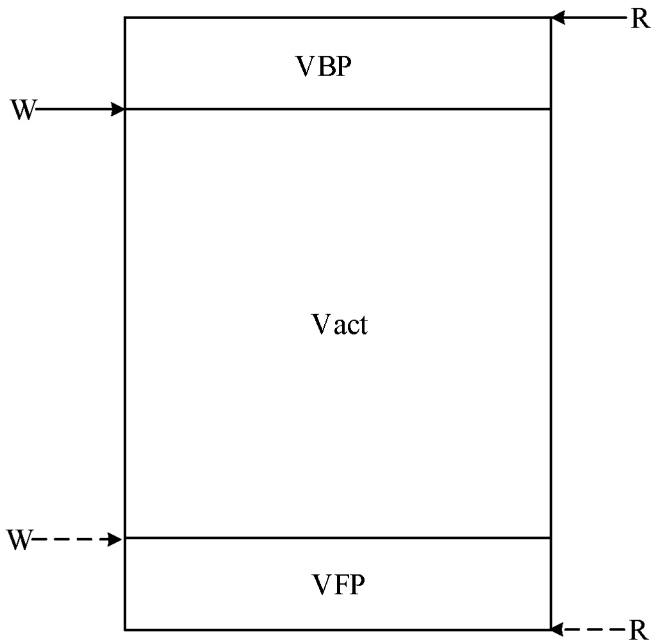
FIG. 1A is a schematic diagram showing a relationship among a vertical back porch (VBP), a vertical front porch (VFP) and the number of vertical active lines according to embodiments of the present disclosure.

Embodiments of the present disclosure are described in detail below, examples of which are illustrated in the drawings, in which the same or similar elements and the elements having the same or similar functions are denoted by same like reference numerals throughout the descriptions unless indicated otherwise. The embodiments described herein with reference to drawings are explanatory, and used to generally understand the present disclosure, but shall not be construed to limit the present disclosure.

For convenience of understanding, some technical terms used in the present disclosure are explained as follows.

Tearing effect (TE) is a phenomenon that a part of an old image and a part of a new image appear in a display screen since a reading (R) pointer and a writing (W) pointer of a frame memory overlap in an image frame.

A TE signal is a signal generated by a DDIC chip, which is used to prevent the TE of the image display when an image is refreshed. When it is ready to refresh a next image frame, the DDIC chip generates the TE signal, and a corresponding application processor (AP) sends data of the next image frame to the DDIC chip after monitoring a trigger porch of the TE signal.

A vertical synchronization (Vsync) signal is a signal used to indicate that scanning of a previous image frame is ended and scanning of a next image frame is started. A frequency value of the Vsync signal is related to a frame display time (FDT).

The frame display time (FDT), also known as a frame synchronization cycle, is determined by a refresh rate of a display screen. The larger the refresh rate, the smaller the FDT, and the smaller the refresh rate, the larger the FDT. The FDT includes a vertical porch and an image display time (IDT).

The vertical porch includes a vertical front porch (VFP) and a vertical back porch (VBP).

The image display time (IDT) is a duration taken to drive the display screen from displaying a first line of an image frame to displaying the last line of the image frame completely. After the display screen is fixed, the IDT parameter is fixed.

Figure 1B:
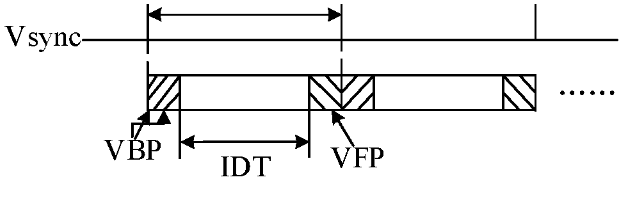
FIG. 1B is a schematic diagram showing a relationship among a VBP, a VFP, an image display time (IDT) and a frame display time (FDT) according to embodiments of the present disclosure.

A relationship among the VBP, the VFP and other signals according to some embodiments of the present disclosure is schematically shown in FIG. 1A and FIG. 1B. Specifically, FIG. 1A schematically shows a relationship among the VBP, the VFP and the number of vertical active (Vact) lines. Correspondingly, FIG. 1B schematically shows a relationship among the VBP, the VFP, the IDT and the FDT.

Figure 2:
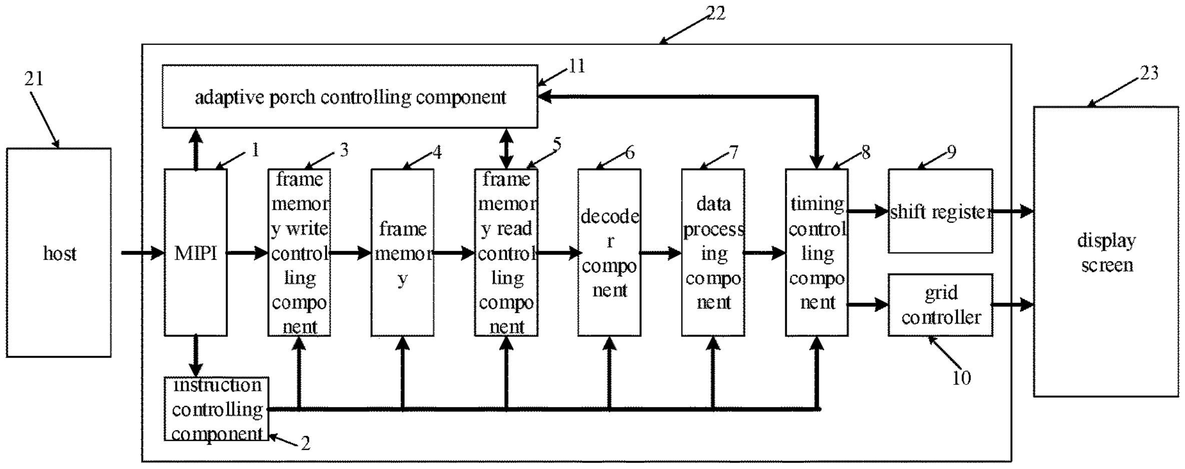
FIG. 2 is a schematic diagram showing a structure of a terminal according to embodiments of the present disclosure.

FIG. 2 is a schematic diagram showing a structure of a terminal according to embodiments of the present disclosure. A common display screen, such as a liquid crystal display (LCD) screen, a light emitting diode (LED) display screen, or an organic LED (OLED) display screen, may be driven to display images using a driving architecture as shown in FIG. 2.

As shown in FIG. 2, the driving architecture includes a host 21 (also known as an application processor, AP), a DDIC chip 22 and a display screen 23.

The DDIC chip 22 includes a mobile industry processor interface (MIPI), an instruction controlling component 2, a frame memory write controlling component 3, a frame memory 4, a frame memory read controlling component 5, a decoder component 6, a data processing component 7, a timing controlling component 8, a shift register 9 (also known as a source driver), and a grid controller 10.

The MIPI 1 receives image data and a display command from the AP 21. The instruction controlling component 2 is configured to process the display command sent by the AP 21. The frame memory write controlling component 3 is configured to write an image frame transmitted by the AP 21 into the frame memory 4. The frame memory 4 is configured to store the image frame. The frame memory read controlling component 5 is configured to read the image frame stored in the frame memory 4. The decoder component 6 is configured to decode the read image frame. The data processing component 7 is configured to modify and correct the decoded image data. The timing controlling component 8 is configured to send the processed image data to the shift register 9, provide synchronization signals and clock signals to each component of the DDIC 22, and generate a TE signal, such that the AP 21 may send the image synchronously with the refresh rate.

The shift register 9, also known as the source driver, is configured to sequentially shift the image data sent by the timing controlling component 8, and sent the image data to the display screen 23 through the source driver. The gate controller 10 is configured to control a gate drive of the display screen 23 according to a driving signal sent by the timing controlling component 8.

In the present disclosure, in order to avoid the overlap of the R pointer and the W pointer of the frame memory in the same image frame caused by the update of the refresh rate, i.e., the change of an image transmission speed of the AP, the VBP and/or the VFP may be updated in real time according to the image transmission speed of the AP. For this, as shown in FIG. 2, the DDIC chip 22 may further include an adaptive porch controlling component 11 that is used to update the corresponding vertical porch of each image frame in real time.

Figure 3A:
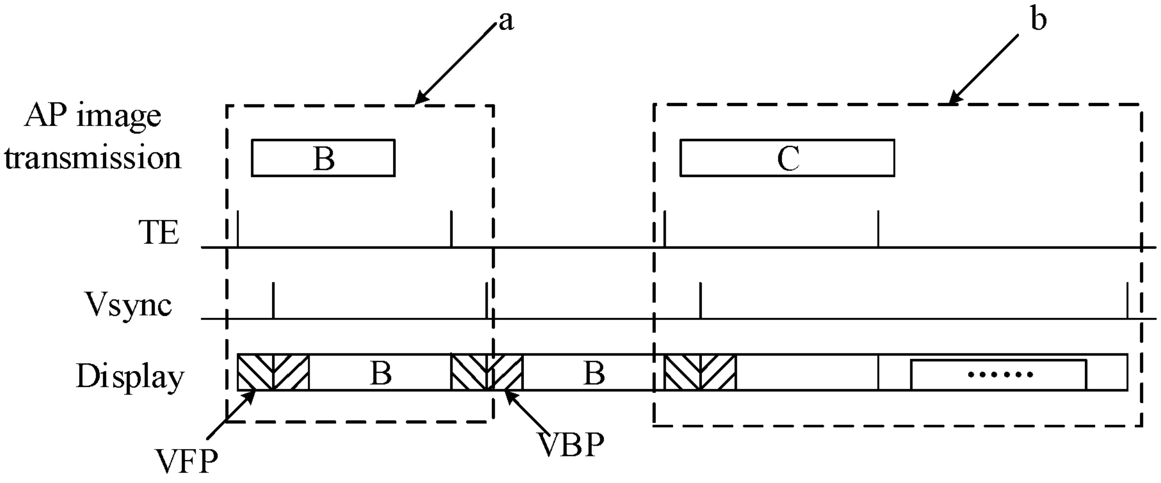
FIG. 3A is a schematic diagram showing a signal timing according to embodiments of the present disclosure.
Figure 3B:
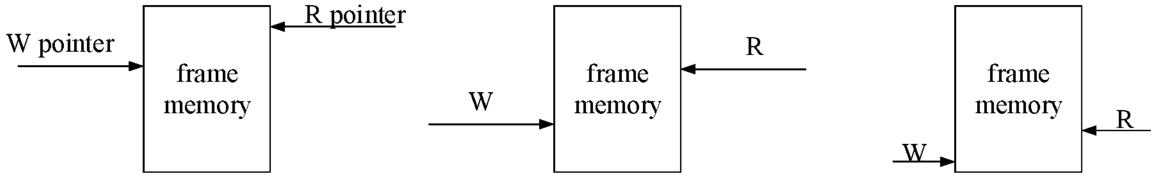
FIG. 3B is a schematic diagram showing positions of a reading (R) pointer and a writing (W) pointer of a frame memory according to embodiments of the present disclosure.
Figure 3C:
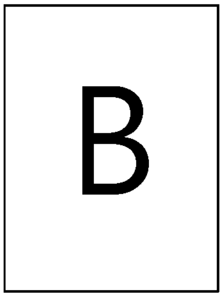
FIG. 3C is a schematic diagram showing a display effect of a display screen without a tearing effect according to embodiments of the present disclosure.

FIG. 3A to FIG. 3E are schematic diagrams showing a signal timing, positions of the R pointer and the W pointer of the frame memory, and a display effect of the display screen according to some embodiments of the present disclosure. During the display driving process, as shown in an area a of FIG. 3A, the image transmission speed of the AP is fast enough and synchronized with the TE signal, so the W pointer and R pointer of the frame memory of the DDIC are located at positions corresponding to different moments during the display of the image frame. As shown in FIG. 3B, the W pointer and the R pointer do not overlap in individual cases shown in FIG. 3B, and the display effect of the display screen is shown in FIG. 3C, in which the displayed image is not torn.

It should be illustrated that in FIG. 3A to FIG. 3E, the capital letters “B” and “C” are respectively used to represent the corresponding contents of frame images.

Figure 3D:
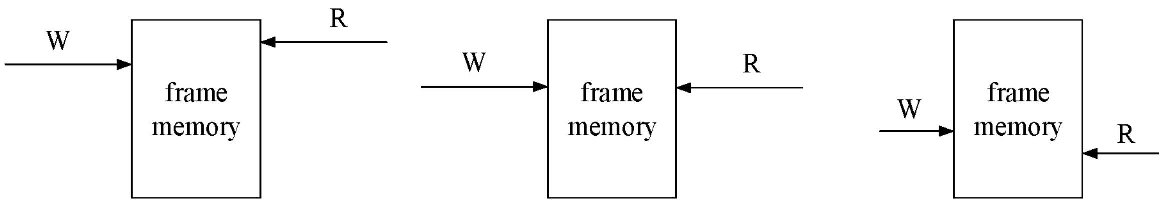
FIG. 3D is a schematic diagram showing positions of an R pointer and a W pointer of a frame memory according to embodiments of the present disclosure.
Figure 3E:
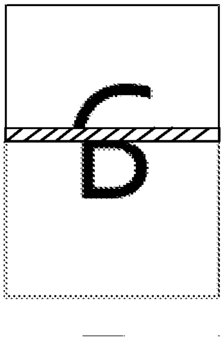
FIG. 3E is a schematic diagram showing a display effect of a display screen with a tearing effect according to embodiments of the present disclosure.

However, in an area b of FIG. 3A, the refresh rate of the display screen is slow, and correspondingly, the image transmission speed of the AP is also slow. In this case, even though the AP transmits images synchronously with the TE signal, the W pointer and the R pointer of the frame memory of the DDIC may overlap during the display of one image frame as shown in FIG. 3D, such that images displayed on the display screen may be as shown in FIG. 3E, that is, the tearing effect happens.

In order to solve the above-mentioned problems, the present disclosure provides a display driving method. In the present disclosure, the DDIC chip determines the vertical porch (the VBP and/or the VFP) corresponding to a current image frame in real time according to the image transmission speed of the AP during the transmission of each image frame, and drives the display screen according to the determined vertical porch, thereby avoiding the overlap of the W pointer and the R pointer of the frame memory of the DDIC during the display of each image frame, and effectively avoiding the tearing effect of the displayed image.

The display driving method, the display driving apparatus and the DDIC chip according to embodiments of the present disclosure will be described in detail below with reference to the accompanying drawings.

Figure 4:
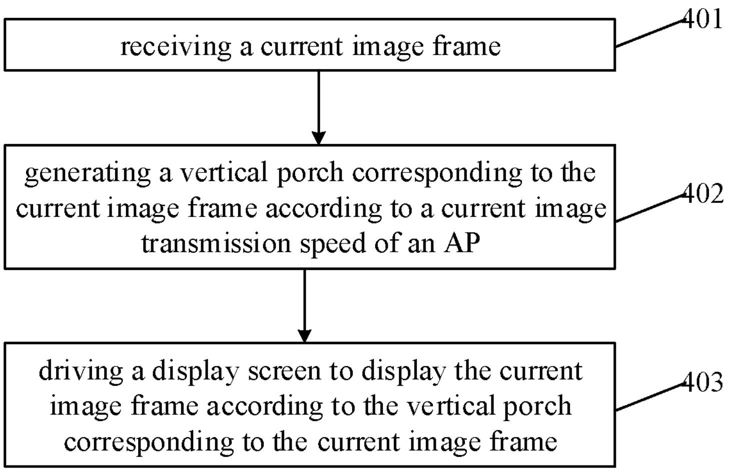
FIG. 4 is a schematic flow chart of a display driving method according to embodiments of the present disclosure.

FIG. 4 is a schematic flow chart of a display driving method according to embodiments of the present disclosure. The display driving method includes the following step 401 to step 403.

In step 401, a current image frame is received.

The current image frame is an image frame that is transmitted to the DDIC by the AP through the MIPI and is to be written into the frame memory of the DDIC.

In step 402, a vertical porch corresponding to the current image frame is generated according to a current image transmission speed of the AP.

The vertical porch corresponding to the current image frame includes a vertical front porch (VFP) and/or a vertical back porch (VBP). That is, the DDIC may generate the VBP and/or the VFP corresponding to the current image frame according to the current image transmission speed of the AP.

In some embodiments, the DDIC may determine the vertical porch corresponding to each image frame transmitted from the AP when the image frame is received.

When the refresh rate of the display screen does not change, that is, the image transmission speed of the AP does not change, vertical porches corresponding to image frames are the same. Taking this into consideration, in order to reduce the processing burden of the DDIC, in some embodiments of the present disclosure, it is possible to determine the vertical porch corresponding to the current image frame received according to the current image transmission speed when it is determined that the image transmission speed of the AP changes. On this regard, the present disclosure does not make further limitations.

In some embodiments of the present disclosure, the DDIC may determine whether the image transmission speed of the AP changes according to a current FDT (i.e., frame synchronization cycle) signal.

Figure 5A:
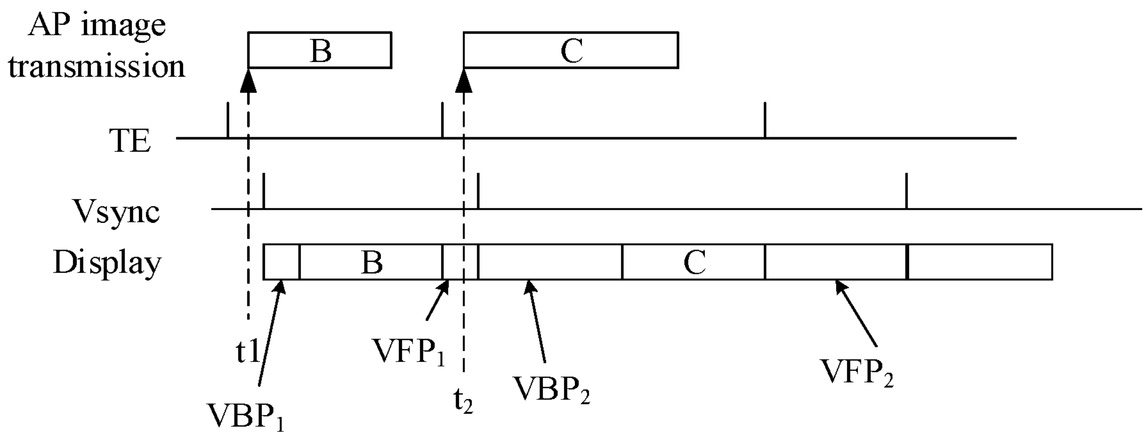
FIG. 5A is a schematic diagram showing a signal timing, and positions of an R pointer and a W pointer of a frame memory when a refresh rate slows according to embodiments of the present disclosure.
Figure 5B:
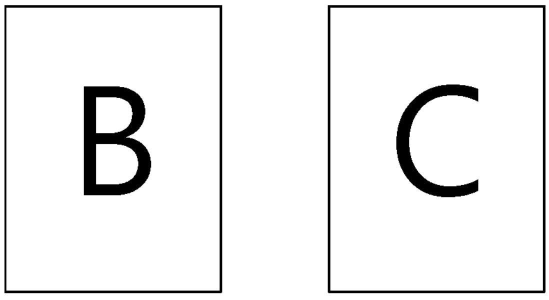
FIG. 5B is a schematic diagram showing a display effect of a display screen when a refresh rate slows according to embodiments of the present disclosure.

FIG. 5A is a schematic diagram showing a signal timing, and positions of an R pointer and a W pointer of a frame memory when a refresh rate slows according to embodiments of the present disclosure; and FIG. 5B is a schematic diagram showing a display effect of a display screen when a refresh rate slows according to embodiments of the present disclosure. As shown in FIG. 5A, if the refresh rate does not change, the cycle of the FDT signal will not change, so that the image transmission speed and the image transmission cycle of the AP will not change. Therefore, when each image frame is received, the DDIC may determine whether the image transmission speed of the AP changes according to the currently determined FDT signal cycle.

In some embodiments, when the refresh rate changes, if the AP does not transmit a new image, that is, the image in the frame memory will not be rewritten, the VBP and the VFP will not be updated, and the image tearing effect will not occur. In this case, the DDIC may not re-determine the VBP and the VFP. Therefore, in some embodiments of the present disclosure, the DDIC may start to determine the vertical porch corresponding to the current image frame according to the current image transmission speed at a first moment (such as a moment $t_1$ shown in FIG. 5A) of receiving the image transmitted by the AP, which not only avoids the meaningless determination of the VBP and VFP in advance, but also avoids the tearing effect of the newly transmitted image frame caused by un-updated VBP and VFP.

In some embodiments, the DDIC may start to determine the vertical porch corresponding to the current image frame according to the current image transmission speed after determining that the data amount of the current image frame received reaches a certain threshold. On this regard, the present disclosure does not make further limitations.

In step 403, a display screen is driven to display the current image frame according to the vertical porch corresponding to the current image frame.

It should be noted that after the vertical porch corresponding to the current image frame is determined, the DDIC will drive the display screen to display the current image frame based on the VBP and/or the VFP corresponding to the current image frame only when the frame synchronization signal Vsync is received.

For example, as shown in FIG. 5A, at a moment $t_1$, the DDIC receives an image "B" transmitted by the AP, and then generates a $VBP_1$ and a $VFP_1$ corresponding to the image "B" according to the current image transmission speed of the AP, that is, generates the $VBP_1$ and the $VFP_1$ which avoid the tearing effect of the image "B". After the Vsync signal is received, the display screen may be driven to display the image "B" normally according to the determined $VBP_1$ and $VFP_1$, such that the display screen can normally display the image "B", with a display effect as shown in FIG. 5B.

Subsequently, at a moment $t_2$ as shown in FIG. 5A, an image "C" transmitted by the AP is received, and then a $VBP_2$ and a $VFP_2$ corresponding to the image "C" are generated according to the current image transmission speed of the AP, that is, the $VBP_2$ and the $VFP_2$ which avoid the tearing effect of the image "C" are generated, such that the display screen may be driven to display the image "C" normally according to the determined $VBP_2$ and $VFP_2$ after the Vsync signal is received, so that the display screen can normally display the image "C", with a display effect as shown in FIG. 5B.

It should be noted that in the present disclosure, the DDIC may determine the VBP and/or the VFP corresponding to the transmission speed of the current image in an appropriate way, to ensure that the R pointer and the W pointer corresponding to the frame memory will not overlap during the transmission of each image frame. The VBP and/or the VFP may be determined in any appropriate way, which may be selected according to actual needs. On this regard, the present disclosure does not make further limitations. Any scheme of dynamically determining the VBP and/or VFP corresponding to an image according to the image transmission speed of the AP is within the protection scope of the present disclosure.

In embodiments of the present disclosure, when the DDIC chip receives the current image frame, the vertical porch corresponding to the current image frame may be determined according to the current image transmission speed of the AP, and the display screen is driven to display the current image frame based on the determined vertical porch. In this way, the vertical porch corresponding to the current image frame is determined in real time according to the current image transmission speed of the AP, which effectively avoids the tearing phenomenon when driving the display screen with a changeable refresh rate.

It could be seen from the above description that the DDIC may determine the vertical porch corresponding to the current image frame when each image frame is received, and drive the display screen to display the current image frame according to the determined vertical porch. Alternatively, the DDIC may determine the vertical porch corresponding to a newly received image frame when it is determined that the refresh rate of the display screen changes, that is, the image transmission speed of the AP changes. In the following, a process of the DDIC determining the image transmission speed of the AP is described in detail with reference to FIG. 6.

Figure 6:
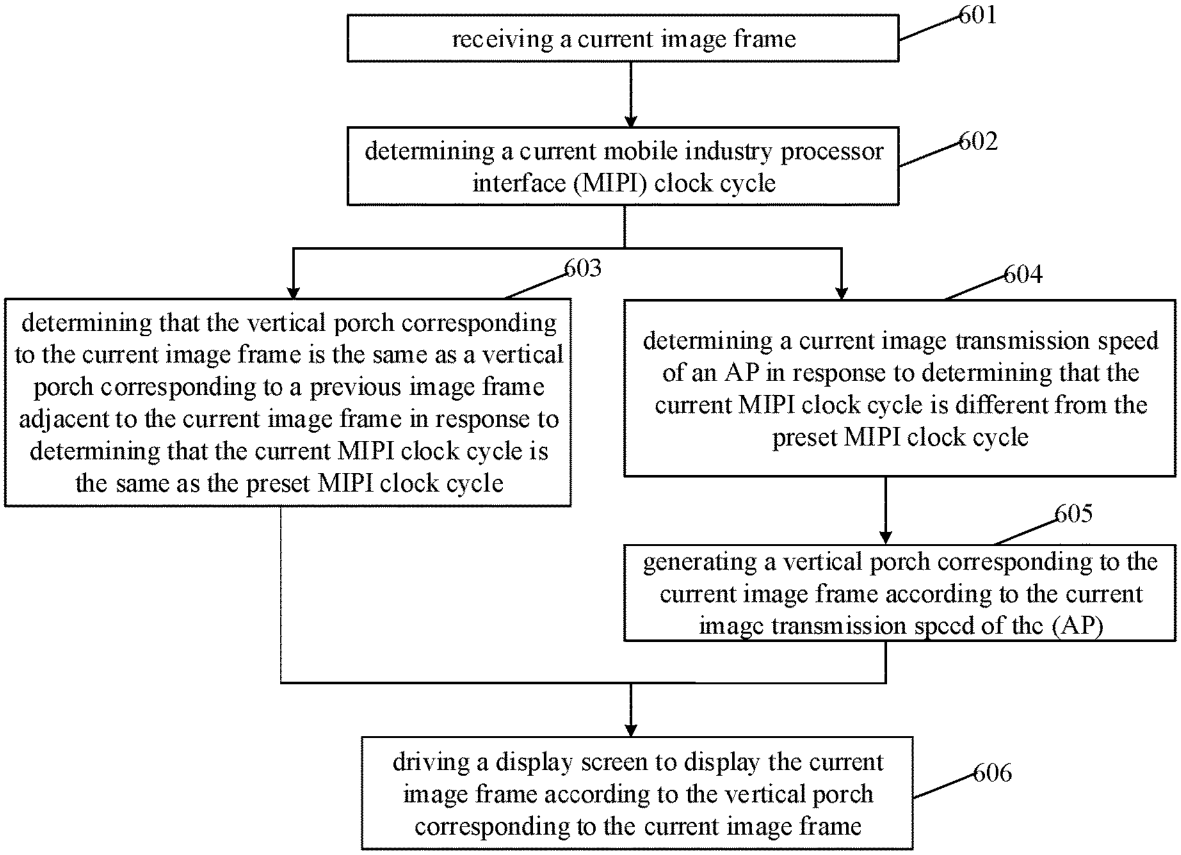
FIG. 6 is a schematic flow chart of a display driving method according to embodiments of the present disclosure.

FIG. 6 is a schematic flow chart of a display driving method according to embodiments of the present disclosure. As shown in FIG. 6, the method includes the following step 601 to step 606.

In step 601, a current image frame is received.

In step 602, a current MIPI clock cycle is determined.

In step 603, it is determined that a vertical porch corresponding to the current image frame is the same as a vertical porch corresponding to a previous image frame adjacent to the current image frame in response to determining that the current MIPI clock cycle is the same as a preset MIPI clock cycle.

The preset MIPI clock cycle (MCC) is an MIPI clock cycle when the DDIC determines the vertical porch corresponding to the previous image frame adjacent to the current image frame (also called as adjacent previous image frame), or is a corresponding MIPI clock cycle before the refresh rate is updated.

In the present disclosure, if the MIPI clock cycle when the current image frame is received by the DDIC is the same as the preset MIPI clock cycle, it indicates that the current image transmission speed of the AP does not change, that is, the refresh rate of the display screen is not updated, such that the VBP and/or the VFP corresponding to the current image frame are not re-determined, and the VBP and the VFP corresponding to the adjacent previous image frame may be directly determined as the VBP and the VFP corresponding to the current image frame.

In step 604, a current image transmission speed of the AP is determined in response to determining that the current MIPI clock cycle is different from the preset MIPI clock cycle.

If the MIPI clock cycle when the DDIC receives the current image frame is different from the preset MIPI clock cycle, it indicates that the current image transmission speed of the AP changes compared with the display of the adjacent previous image frame, that is, the refresh rate of the display screen changes, in this case, the DDIC needs to determine the current image transmission speed of the AP. Alternatively, the DDIC may determine the current image transmission speed of the AP (i.e., write speed calculation for MIPI, WSC) based on the current MIPI clock cycle and a reference clock cycle (RCC). In some embodiments, the WSC is determined by Formula (1):

$$WSC=RCC/MCC \quad (1).$$

The reference clock cycle (RCC) is a clock signal generated by the timing controlling component in the DDIC. After the display screen is fixed, the RCC signal remains unchanged.

The MCC is generally related to the current refresh rate of the display screen and the number of data lanes corresponding to the MIPI. When the number of the data lanes of the MIPI remains unchanged, the timing controlling component in the DDIC may generate a corresponding MCC based on an updated refresh rate of the display screen. That is to say, when the refresh rate of the display screen is updated, the MCC is updated accordingly.

It should be noted that if the current MCC is different from the MCC corresponding to the adjacent previous image frame, the DDIC may determine the current MCC as a new preset MCC after the current image transmission speed of the AP is determined based on the current MCC and RCC, such that when the next image frame arrives, the DDIC may determine whether a new image transmission speed of the AP needs to be determined based on whether the MCC when the next image frame arrives is the same as the preset MCC.

In step 605, a vertical porch corresponding to the current image frame is generated according to the current image transmission speed of the AP.

In some embodiments, the DDIC may determine a write time of writing the current image frame into the frame memory according to the current image transmission speed and display parameters of the display screen. The VBP corresponding to the current image frame is determined according to the write time and a preset IDT. The VFP corresponding to the current image frame is determined according to the FDT corresponding to the display screen, the preset IDT and the VBP.

The display parameters of the display screen may include a horizontal display size (HDS), a vertical display size (VDS) and the number of bytes per pixel (BPP) of the display screen. It should be noted that the HDS is also called the number of effective display lines of the display screen, and the VDS is also called the number of effective display columns of the display screen.

It should be noted that the number of lanes for transmitting data simultaneously in an MIPI clock cycle will affect the write time of writing the current image frame into the frame memory, and the less the number of lanes that transmit data in the MIPI, the greater the write time. Therefore, when the DDIC determines the write time corresponding to the current image frame, it needs to consider the number of lanes in the MIPI that transmit data simultaneously in the current MIPI clock cycle.

Since the current image frame is an image frame transmitted through the MIPI, the write time of writing the current image frame into the frame memory is also called MIPI image write time (MIWT).

Figure 7:
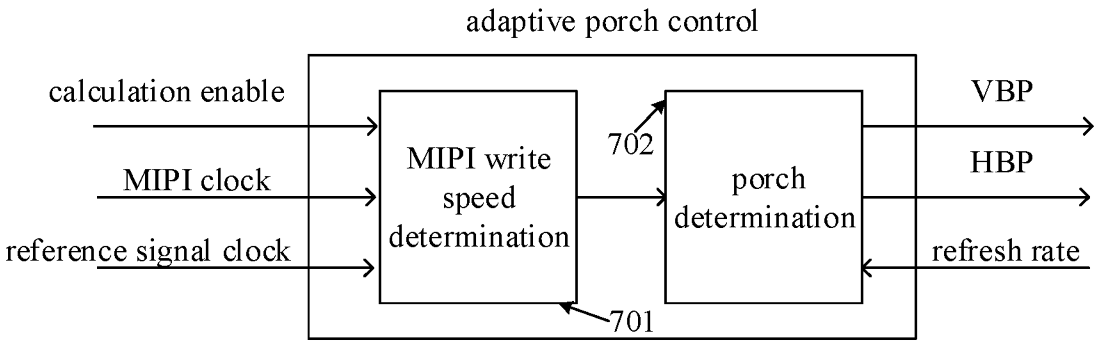
FIG. 7 is a schematic diagram showing an adaptive porch controlling component in a DDIC chip according to embodiments of the present disclosure.

A structure of the adaptive porch controlling component 11 in the DDIC chip may be as shown in FIG. 7. As shown in FIG. 7, the adaptive porch controlling component includes a MIPI write speed determination unit 701 and a porch determination unit 702. The MIPI write speed determination unit 701 is configured to determine a MIPI write speed (WSC) according to the received MIPI clock cycle and the reference clock cycle. The porch determination unit 702 is configured to determine the VBP and the VFP according to the WSC and the current refresh rate. In some embodiments, the DDIC may enable the MIPI write speed determination unit 701 to start a determination process through an enable signal. In this regard, the present disclosure will not make further limitation. In addition, the preset IDT refers to an IDT corresponding to the current display screen. It could be understood that for the same image frame data and the same display parameters, the faster the read speed corresponding to the frame memory, the shorter the time taken to drive the display screen to display a complete image, that is, the smaller the IDT. On the contrary, the slower the read speed corresponding to the frame memory, the longer the time taken to drive the display screen to display a complete image, that is, the larger the IDT.

In the present disclosure, the DDIC may determine the VBP and the VFP according to a relationship between a current MIWT and the IDT, i.e., a relationship between a speed of the R pointer currently corresponding to the frame memory and a speed of the W pointer, so as to avoid that the R pointer currently corresponding to the frame memory overlaps with the W pointer during reading image data from the frame memory.

As shown in FIG. 5A, when the MIWT decreases (the transmission speed of image "C" is slower than that of image "B"), that is, the speed of the W pointer corresponding to the frame memory becomes slower. In this case, in order to avoid the R pointer corresponding to the frame memory to overlap with the W pointer when reading image data from the frame memory, a value of the VBP may be appropriately increased, that is, $VBP_2$ is greater than $VBP_1$.

Further, after the VBP is determined, the VFP corresponding to the current image frame may be determined according to the FDT, the IDT and the VBP that correspond to the current image frame.

It could be understood that the FDT corresponding to the current image frame is determined by the current refresh rate of the display screen. When the DDIC receives the current image frame, the value of the FDT corresponding to the current image frame is determined according to the current refresh rate of the display screen. The value of the VFP corresponding to the current image frame may be determined based on a difference between the FDT and the IDT and VBP. As can be seen from FIG. 5A, when the MIWT decreases, the value of the VFP also may increase.

Figure 8:
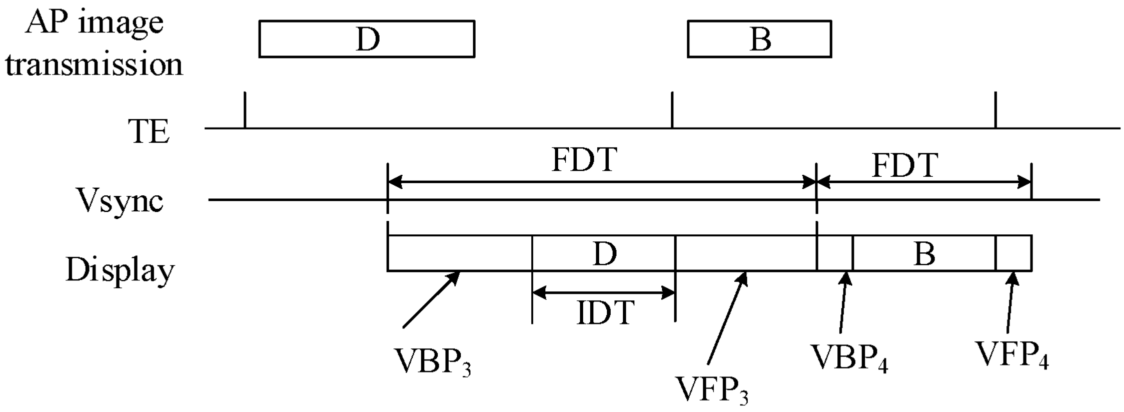
FIG. 8 is a schematic diagram showing a signal timing, positions of an R pointer and a W pointer of a frame memory, and a display effect when a refresh rate becomes faster according to embodiments of the present disclosure.

In some embodiments, as shown in FIG. 8, when the MIWT increases (the transmission speed of image "B" is faster than that of image "D"), that is, the speed of the W pointer corresponding to the frame memory becomes faster. In this case, in order to avoid the R pointer corresponding to the frame memory being overtaken by the W pointer when reading image data from the frame memory, that is, to avoid overlap of the R pointer and the W pointer, a value of the VBP may be appropriately reduced, that is, $VBP_3$ is greater than $VBP_4$.

In addition, when the refresh rate changes, the FDT will change also, so that the DDIC may first determine the VBP corresponding to the current image frame according to the MIWT, and then determine the VFP corresponding to the current image frame according to the FDT, the VBP and the IDT that correspond to the current image frame. As can be seen from FIG. 8, when the MIWT increases, the value of the VFP also may decrease.

In step 606, the display screen is driven to display the current image frame according to the vertical porch corresponding to the current image frame.

In embodiments of the present disclosure, when an image frame is received, it is first determined whether the current MIPI clock cycle is the same as the MIPI clock cycle corresponding to the adjacent previous image frame. If the current MIPI clock cycle is the same as the MIPI clock cycle corresponding to the adjacent previous image frame, it is determined that the vertical porch corresponding to the current image frame is the same as the vertical porch corresponding to the adjacent previous image frame. If the current MIPI clock cycle is different from the MIPI clock cycle corresponding to the adjacent previous image frame, the vertical porch corresponding to the current image frame is determined according to the current image transmission speed of the AP, and the display screen is driven to display the current image frame according to the vertical porch corresponding to the current image frame. In this way, by monitoring whether the refresh rate of the display screen changes in real time, the vertical edge corresponding to the current image frame is updated according to the new image transmission speed of the AP when the refresh rate changes, which effectively avoids the overlap of the R pointer and the W pointer corresponding to the frame memory, and avoids the tearing effect of the display screen.

It could be seen from the above description that after the DDIC determines the vertical porch corresponding to the current image frame, the display screen is driven to display the current image frame according to the vertical porch corresponding to the current image frame. In some embodiments, the DDIC needs to determine the frame synchronization moment corresponding to the current image frame, and drives the display screen to display the current image frame based on the vertical porch corresponding to the current image frame starting from the frame synchronization moment, which will be described in detail below with reference to FIG. 9.

Figure 9:
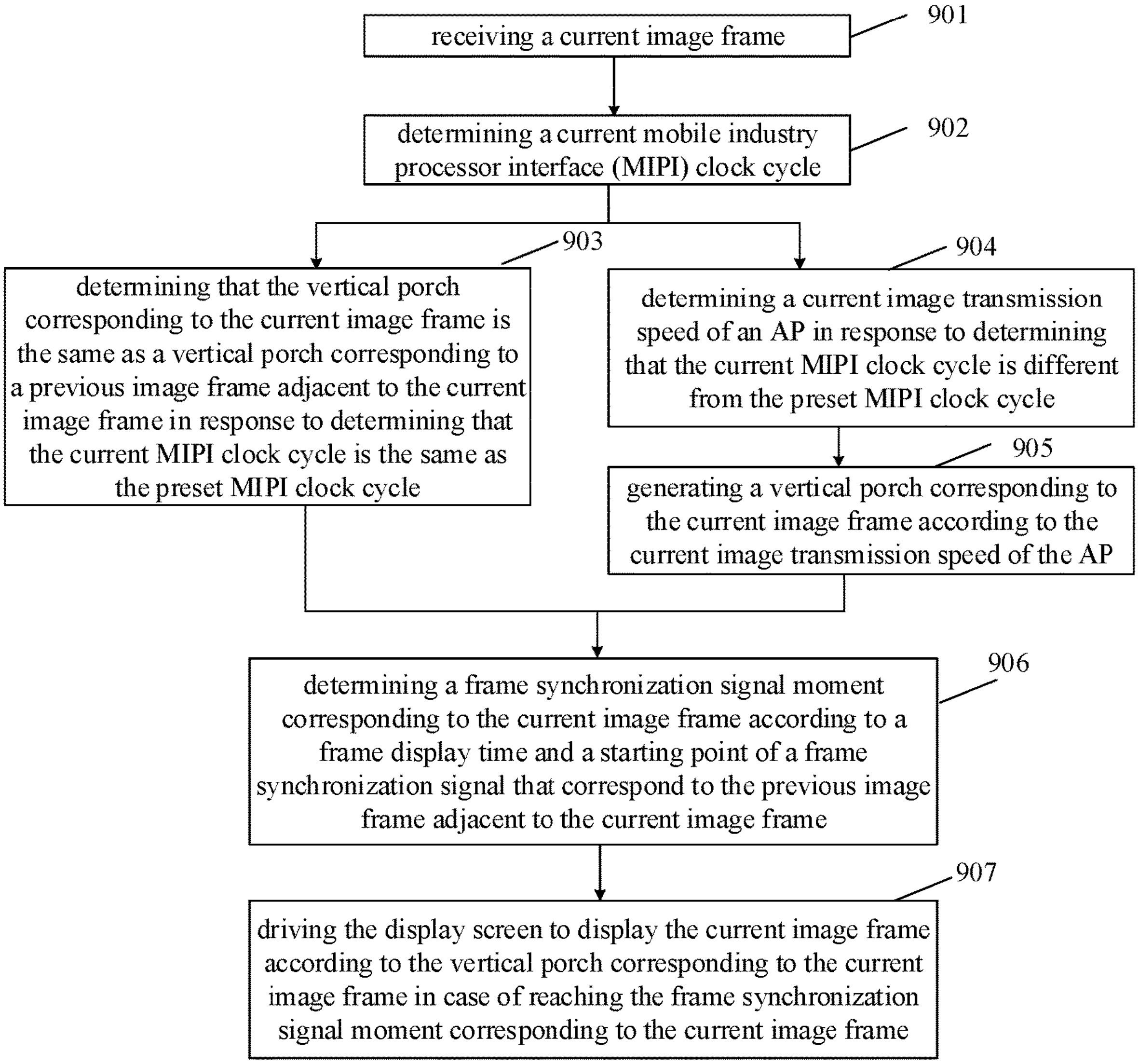
FIG. 9 is a schematic flow chart of a display driving method according to embodiments of the present disclosure.

FIG. 9 is a schematic flow chart of a display driving method according to embodiments of the present disclosure. As shown in FIG. 9, the display driving method includes the following step 901 to step 907.

In step 901, a current image frame is received.

In step 902, a current MIPI clock cycle is determined.

In step 903, it is determined that a vertical porch corresponding to the current image frame is the same as a vertical porch corresponding to a previous image frame adjacent to the current image frame in response to determining that the current MIPI clock cycle is the same as the preset MIPI clock cycle.

In step 904, the current image transmission speed of the AP is determined in response to determining that the current MIPI clock cycle is different from the preset MIPI clock cycle.

In step 905, the vertical porch corresponding to the current image frame is generated according to the current image transmission speed of the AP.

The detailed implementations of the step 901 to the step 905 may refer to the detailed description of any embodiments of the present disclosure hereinbefore, and will not be repeated here.

In step 906, a frame synchronization signal moment corresponding to the current image frame is determined according to a frame display time and a starting moment of a frame synchronization signal that correspond to a previous image frame adjacent to the current image frame.

In step 907, a display screen is driven to display the current image frame according to the vertical porch corresponding to the current image frame in case of reaching the frame synchronization signal moment corresponding to the current image frame.

In the present disclosure, when the VBP and the VFP corresponding to the current image frame are determined, the frame display time of the previous image frame adjacent to the current image frame may not be ended. In this case, in order to avoid the influence of immediately starting the driving display of the current image frame on the normal display of the previous image frame, the DDIC may first determine an ending moment of the VFP of the adjacent previous image frame, i.e., a starting moment of the VBP corresponding to the current image frame. When the starting moment of the VBP corresponding to the current image frame is reached, the display screen is driven to display the current image frame based on the VBP and the VFP corresponding to the current image frame.

Specifically, as the FDT is related to the refresh rate, that is, under different refresh rates, the FDT corresponding to the image frame is different, the DDIC may determine the ending moment of the VFP corresponding to the previous image frame, i.e., the starting moment of the VBP corresponding to the current image frame, according to the FDT and the frame synchronization signal Vsync moment corresponding to the adjacent previous image frame. As shown in FIG. 8, the starting moment of the FDT corresponding to each image frame is synchronized with the frame synchronization signal corresponding to this image frame. Therefore, after the DDIC determines the FDT and the frame synchronization signal moment corresponding to each image frame, the frame synchronization signal moment plus the FDT to obtain the ending moment of the VFP corresponding to this image frame, which also is the frame synchronization signal moment corresponding to a next image frame.

It should be noted that the DDIC chip may synchronously determine the VBP, the VFP and the frame synchronization signal moment corresponding to the current image frame after it is determined that the refresh rate changes. Alternatively, the DDIC chip may first determine the frame synchronization signal moment corresponding to the current image frame, and then determine the VBP and the VFP corresponding to the current image frame. That is, the DDIC may first perform the above-mentioned step 906, and then perform the step 902 to the step 905. Alternatively, the DDIC may synchronously perform the step 906 and the step 902 to the step 905.

It could be understood that in the present disclosure, after the refresh rate of the display screen is updated, not only the VBP and the VFP corresponding to the current image frame are determined according to the current image transmission speed of the AP, but also the frame synchronization signal moment corresponding to the current image frame is determined according to the FDT and the frame synchronization signal moment corresponding to the previous image frame. When the frame synchronization signal moment corresponding to the current image frame is reached, the display screen is driven to display the current image frame based on the VBP and the VFP corresponding to the current image frame, which avoids the tearing effect of the previous image frame or the current image frame caused by the updated refresh rate.

It should be noted that if the current refresh rate changes, the FDT corresponding to the current image frame also will change, so that the DDIC may determine the FDT corresponding to the current image frame according to the changed refresh rate and determine the VFP corresponding to the current image frame according to the newly determined VBP and the corresponding IDT.

In the present disclosure, when the image frame is received, it is first determined whether the current MIPI clock cycle is the same as the MIPI clock cycle corresponding to the adjacent previous image frame. If the current MIPI clock cycle is the same as the MIPI clock cycle corresponding to the adjacent previous image frame, it is determined that the vertical porch corresponding to the current image frame is the same as the vertical porch corresponding to the adjacent previous image frame. If the current MIPI clock cycle is different from the MIPI clock cycle corresponding to the adjacent previous image frame, the vertical porch corresponding to the current image frame is determined according to the current image transmission speed of the AP, and the display screen is driven to display the current image frame according to the vertical porch corresponding to the current image frame when the frame synchronization signal moment corresponding to the current image frame is reached. In this way, by monitoring whether the refresh rate of the display screen changes in real time, the vertical porch corresponding to the current image frame is updated according to the new image transmission speed of the AP when the refresh rate changes, and the display screen is driven to display the current image frame based on the newly determined vertical porch when the frame synchronization signal moment corresponding to the current image frame is reached, thereby effectively avoiding the overlap of the R pointer and the W pointer corresponding to the frame memory, and avoiding the tearing effect of the display screen.

In order to implement the above-mentioned embodiments, the present disclosure further provides a display driving apparatus.

Figure 10:
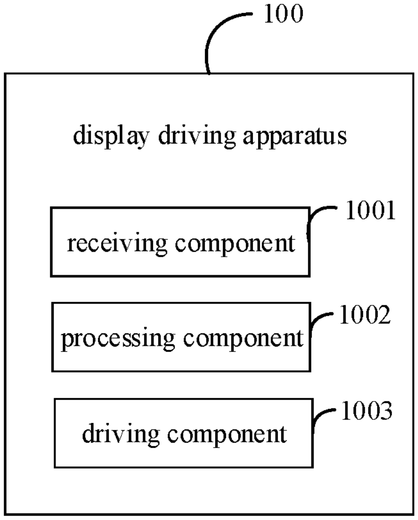
FIG. 10 is a schematic block diagram showing a display driving apparatus according to embodiments of the present disclosure.

FIG. 10 is a schematic block diagram showing a display driving apparatus according to embodiments of the present disclosure.

As shown in FIG. 10, the display driving apparatus 100 is configured in a DDIC chip and includes a receiving component 1001, a processing component 1002 and a driving component 1003.

The receiving component 1001 is configured to receive a current image frame.

The processing component 1002 is configured to generate a vertical porch corresponding to the current image frame according to a current image transmission speed of an AP.

The driving component 1003 is configured to drive a display screen to display the current image frame according to the vertical porch corresponding to the current image frame.

It could be understood that the display driving apparatus as described in embodiments of the present disclosure is a device with the same function as but different name from the adaptive porch controlling component and other components in the DDIC chip of the present disclosure, both of which are configured to generate corresponding VBP and VFP according to the current image transmission speed of the AP during the display of the image frame, and drive the display screen to display the current image frame based on the determined VBP and VFP.

The display driving apparatus may drive and control the display screen by controlling the frame memory read controlling component, the MIPI, the timing controlling component and other components in the DDIC chip.

That is, the receiving component 1001 may be the MIPI inside the DDIC chip and configured to receive image data from the AP. The processing component 1002 may be the adaptive porch controlling component inside the DDIC chip and configured to update the VBP and/or VFP in real time according to the image transmission speed of the AP. The driving component 1003 may include the shift register, the grid controller and the like, and configured to drive a grid electrode and a source electrode of the display screen to display the current image frame according to the vertical porch corresponding to the current image frame.

In some embodiments, the processing component 1002 (i.e., the adaptive porch controlling component) is configured to generate the vertical porch corresponding to the current image frame according to the current image transmission speed in response to the current image transmission speed of the AP changing.

In some embodiments, the processing component 1002 (i.e., the adaptive porch controlling component) is further configured to determine that a current MIPI clock cycle is different from a preset MIPI clock cycle.

In some embodiments, the processing component 1002 (i.e., the adaptive porch controlling component) is further configured to determine that the vertical porch corresponding to the current image frame is the same as a vertical porch corresponding to a previous image frame adjacent to the current image frame in response to determining that the current MIPI clock cycle is the same as the preset MIPI clock cycle.

In some embodiments, the processing component 1002 is configured to determine a current MIPI clock cycle according to a current refresh rate of the display screen and the number of data lanes corresponding to the MIPI; and determine the current image transmission speed of the AP according to the current MIPI clock cycle and a reference clock cycle.

It can be seen from the above description that the above operation of determining the current MIPI clock cycle can be implemented by the timing controlling component in the DDIC chip. That is, the apparatus may include a timing controlling component to determine the current MIPI clock cycle according to a current refresh rate of the display screen and the number of data lanes corresponding to the MIPI. Then, the adaptive porch controlling component determines the current image transmission speed of the AP according to the current MIPI clock cycle and a reference clock cycle.

In some embodiments, the processing component 1002 (i.e., the adaptive porch controlling component) is configured to determine a write time of writing the current image frame into a frame memory according to the current image transmission speed and a display parameter of the display screen; determine a vertical back porch corresponding to the current image frame according to the write time and a preset image display time; and determine a vertical front porch corresponding to the current image frame according to a frame display time corresponding to the display screen, the preset image display time and the vertical back porch.

It can be understood that the above operation of determining the write time of writing the current image frame into the frame memory can be performed by the MIPI write speed determination unit of the adaptive edge control component. Accordingly, the operations of determining the vertical back porch and the vertical front porch can be performed by the porch determination unit of the adaptive edge control component.

In some embodiments, the driving component 1003 is configured to determine a frame synchronization signal moment corresponding to the current image frame according to a frame display time and a frame synchronization signal moment that correspond to a previous image frame adjacent to the current image frame; and drive the display screen to display the current image frame according to the vertical porch corresponding to the current image frame in case of reaching the frame synchronization signal moment corresponding to the current image frame.

It can be understood that the above operation of determining the frame synchronization signal moment corresponding to the current image frame can be performed by the timing controlling component in the DDIC chip. That is, the timing controlling component first determines the frame synchronization signal moment corresponding to the current image frame, then the shift register, the grid controller and the like drive the display screen to display the current image frame according to the vertical porch corresponding to the current image frame in case of reaching the frame synchronization signal moment corresponding to the current image frame.

It should be illustrated that functions and specific implementation processes of the above-mentioned components in embodiments of the present disclosure may refer to the relevant parts of the methods as described in above embodiments, which will not be repeated here.

According to the display driving apparatus according to embodiments of the present disclosure as back-up, when the DDIC chip receives the current image frame, the vertical porch corresponding to the current image frame is determined according to the current image transmission speed of the AP, and the display screen is driven to display the current image frame based on the determined vertical porch. In this way, the vertical porch corresponding to the current image frame is determined in real time according to the current image transmission speed of the AP, so as to effectively avoid the tearing phenomenon during driving the display screen with a changeable refresh rate.

Although explanatory embodiments have been shown and described above, it would be appreciated by those skilled in the art that the above embodiments are illustrative and cannot be construed to limit the present disclosure, and changes, modifications, alternatives, and variants may be made in the above embodiments without departing from spirit, principles and scope of the present disclosure.

What is claimed is:

1. A display driving method, comprising:
- receiving a current image frame;
- generating a vertical porch corresponding to the current image frame according to a current image transmission speed of an application processor (AP); and
- driving a display screen to display the current image frame according to the vertical porch corresponding to the current image frame;
- before generating the vertical porch corresponding to the current image frame according to the current image transmission speed of the AP, further comprising:
  - determining a current mobile industry processor interface (MIPI) clock cycle according to a current refresh rate of the display screen and a number of data lanes corresponding to the MIPI;
  - determining the current image transmission speed of the AP according to the current MIPI clock cycle and a reference clock cycle.

2. The method according to claim 1, wherein generating the vertical porch corresponding to the current image frame according to the current image transmission speed of the AP comprises:
- generating the vertical porch corresponding to the current image frame according to the current image transmission speed in response to the current image transmission speed of the AP changing.

3. The method according to claim 1, before generating the vertical porch corresponding to the current image frame according to the current image transmission speed of the AP, further comprising:
- determining that a current MIPI clock cycle is different from a preset MIPI clock cycle.

4. The method according to claim 3, after generating the vertical porch corresponding to the current image frame, further comprising:
- determining that the vertical porch corresponding to the current image frame is the same as a vertical porch corresponding to a previous image frame adjacent to the current image frame in response to determining that the current MIPI clock cycle is the same as the preset MIPI clock cycle.

5. The method according to claim 1, wherein generating the vertical porch corresponding to the current image frame according to the current image transmission speed of the AP comprises:

determining a write time of writing the current image frame into a frame memory according to the current image transmission speed and a display parameter of the display screen;

determining a vertical back porch corresponding to the current image frame according to the write time and a preset image display time; and determining a vertical front porch corresponding to the current image frame according to a frame display time corresponding to the display screen, the preset image display time and the vertical back porch.

6. The method according to claim 1, wherein driving the display screen to display the current image frame according to the vertical porch corresponding to the current image frame comprises:

determining a frame synchronization signal moment corresponding to the current image frame according to a frame display time and a frame synchronization signal moment that correspond to a previous image frame adjacent to the current image frame; and driving the display screen to display the current image frame according to the vertical porch corresponding to the current image frame in case of reaching the frame synchronization signal moment corresponding to the current image frame.

7. A display driving apparatus, configured in a display driver integrated circuit (DDIC) chip and comprising:

a mobile industry processor interface (MIPI) configured to receive a current image frame;

an adaptive porch controlling component configured to generate a vertical porch corresponding to the current image frame according to a current image transmission speed of an application processor (AP);

a driving component configured to drive a display screen to display the current image frame according to the vertical porch corresponding to the current image frame; and further comprising a timing controlling component, wherein the timing controlling component is configured to determine a current MIPI clock cycle according to a current refresh rate of the display screen and a number of data lanes corresponding to the MIPI; and wherein the adaptive porch controlling component is configured to: determine the current image transmission speed of the AP according to the current MIPI clock cycle and a reference clock cycle.

8. The apparatus according to claim 7, wherein the adaptive porch controlling component is configured to:

generate the vertical porch corresponding to the current image frame according to the current image transmission speed in response to the current image transmission speed of the AP changing.

9. The apparatus according to claim 7, wherein the adaptive porch controlling component is further configured to:

determine that a current MIPI clock cycle is different from a preset MIPI clock cycle.

10. The apparatus according to claim 9, wherein the adaptive porch controlling component is further configured to:

determine that the vertical porch corresponding to the current image frame is the same as a vertical porch corresponding to a previous image frame adjacent to the current image frame in response to determining that the current MIPI clock cycle is the same as the preset MIPI clock cycle.

11. The apparatus according to claim 7, wherein the adaptive porch controlling component is configured to:

determine a write time of writing the current image frame into a frame memory according to the current image transmission speed and a display parameter of the display screen;

determine a vertical back porch corresponding to the current image frame according to the write time and a preset image display time; and determine a vertical front porch corresponding to the current image frame according to a frame display time corresponding to the display screen, the preset image display time and the vertical back porch.

12. The apparatus according to claim 7, wherein the driving component is configured to:

determine a frame synchronization signal moment corresponding to the current image frame according to a frame display time and a frame synchronization signal moment that correspond to a previous image frame adjacent to the current image frame; and drive the display screen to display the current image frame according to the vertical porch corresponding to the current image frame in case of reaching the frame synchronization signal moment corresponding to the current image frame.

13. A display driver integrated circuit (DDIC) chip, comprising the display driving apparatus according to claim 7.

14. A terminal, comprising:

a display screen;

a display driver integrated circuit (DDIC) chip electrically connected with the display screen; and an application processor (AP) electrically connected with the DDIC chip through a mobile industry processor interface (MIPI);

wherein the DDIC chip is configured to drive the display screen to display an image transmitted from the AP by performing acts comprising:

receiving a current image frame;

generating a vertical porch corresponding to the current image frame according to a current image transmission speed of an application processor (AP); and driving a display screen to display the current image frame according to the vertical porch corresponding to the current image frame;

wherein the DDIC chip is configured to perform the following acts:

determining a current MIPI clock cycle according to a current refresh rate of the display screen and the number of data lanes corresponding to the MIPI; and determining the current image transmission speed of the AP according to the current MIPI clock cycle and a reference clock cycle.

15. The terminal according to claim 14, wherein the DDIC chip is configured to perform the following act:

generating the vertical porch corresponding to the current image frame according to the current image transmission speed in response to the current image transmission speed of the AP changing.

16. The terminal according to claim 14, wherein the DDIC chip is configured to perform the following act:

determining that a current mobile industry processor interface (MIPI) clock cycle is different from a preset MIPI clock cycle.

17. The terminal according to claim 16, wherein the DDIC chip is configured to perform the following act:

determining that the vertical porch corresponding to the current image frame is the same as a vertical porch corresponding to a previous image frame adjacent to the current image frame in response to determining that the current MIPI clock cycle is the same as the preset MIPI clock cycle.

* * * * *